(12) United States Patent
Tu et al.

(10) Patent No.: US 8,892,391 B2
(45) Date of Patent: Nov. 18, 2014

(54) ACTIVITY DETECTION

(75) Inventors: Xiaoyuan Tu, Sunnyvale, CA (US); Ronald K. Huang, San Jose, CA (US); Christopher Moore, San Francisco, CA (US); Glenn Donald MacGougan, San Jose, CA (US); Tusi Chowdhury, San Jose, CA (US)

(73) Assignee: Apple Inc., Cupertino, CA (US)

( * ) Notice: Subject to any disclaimer, the term of this patent is extended or adjusted under 35 U.S.C. 154(b) by 617 days.

(21) Appl. No.: 13/153,361

(22) Filed: Jun. 3, 2011

(65) Prior Publication Data

US 2012/0310587 A1 Dec. 6, 2012

(51) Int. Cl.
*G01P 15/00* (2006.01)
*G01D 1/16* (2006.01)

(52) U.S. Cl.
CPC .................................. *G01D 1/16* (2013.01)
USPC ............ 702/141; 702/127; 702/150; 702/189

(58) Field of Classification Search
CPC ......... G06K 9/00335–9/00348; G06K 9/6234; G06K 9/6232; G06K 9/623–9/6231
USPC ......... 702/127, 141, 147, 150, 155, 160, 189, 702/193–194
See application file for complete search history.

(56) References Cited

U.S. PATENT DOCUMENTS

| | | | |
|---|---|---|---|
| 7,403,487 B1 | 7/2008 | Foladare et al. | |
| 2004/0017947 A1* | 1/2004 | Yang | 382/224 |
| 2004/0266480 A1 | 12/2004 | Hjelt et al. | |
| 2009/0132197 A1 | 5/2009 | Rubin et al. | |
| 2010/0048256 A1 | 2/2010 | Huppi et al. | |
| 2010/0056872 A1 | 3/2010 | Kahn et al. | |
| 2010/0232671 A1* | 9/2010 | Dam et al. | 382/132 |
| 2010/0310157 A1* | 12/2010 | Kim et al. | 382/159 |
| 2011/0106418 A1 | 5/2011 | Van der Merwe | |

FOREIGN PATENT DOCUMENTS

WO WO 2007066953 A1 * 6/2007

OTHER PUBLICATIONS

T. Moon, "The expectation-maximization algorithm," IEEE Signal Processing magazine, vol. 13, No. 6, pp. 47-60, 1996.*
Phinyomark et al., "Application of Linear Discriminant Analysis in Dimensionality Reduction for Hand Motion Classification", 2012, Measurement Science Review, vol. 12, No. 3, pp. 82-89.*

* cited by examiner

*Primary Examiner* — Mischita Henson
(74) *Attorney, Agent, or Firm* — Fish & Richardson P.C.

(57) ABSTRACT

Methods, systems, and apparatus, including computer programs encoded on a computer storage medium, for determining a presumed activity associated with a mobile device. A plurality of sensor values detected by one or more sensors onboard the mobile device is received over a period of time. A plurality of derived values is calculated from the plurality of sensor values. The derived values are selectively combined to generate one or more abstract values. A presumed activity is identified from a plurality of possible activities based on a level of similarity between the one or more abstract values and expected values of each of the plurality of possible activities that correspond to the one or more abstract values.

19 Claims, 10 Drawing Sheets

ACTIVITY DETECTION

TECHNICAL FIELD

The subject matter described in this specification relates to determining a presumed activity associated with mobile devices.

BACKGROUND

Some modern mobile devices contain a variety of sensors that provide useful dynamic information about the current state of the device. For example, some devices include a three axis accelerometer that measures linear acceleration within a local inertial frame and a three axis magnetometer. One purpose of the accelerometer and magnetometer is to provide device orientation measurements (e.g., pitch, roll and yaw angles). Some devices include a Global Position System (GPS) receiver that provides three dimensional location measurements in real-time for use by applications (e.g., map services). In some mobile devices, other sensors are also included, such as a proximity sensor to detect the mobile device's proximity to a user's ear, and image or audio sensors for capturing images, voice, and/or video. The data collected from the sensors on a mobile device and other contextual data associated with the mobile device can be used for various applications.

SUMMARY

In accordance with the systems and processes described in this specification, a plurality of sensor values detected by one or more sensors onboard a mobile device over a period of time is received. A plurality of derived values is calculated from the plurality of sensor values. The derived values are selectively combined to generate one or more abstract values. A presumed activity is identified from a plurality of possible activities based on a level of similarity between the one or more abstract values and expected values of each of the plurality of possible activities that correspond to the one or more abstract values.

Possible implementations can optionally include one or more of the following features. The derived values are selectively combined by determining at least one linear combination of the derived values to generate the one or more abstract values based on results of a linear discriminant analysis. The linear discriminant analysis is performed on derived values associated with sensor data samples collected during a training phase prior to receiving the plurality of sensor values. The linear discriminant analysis identifies particular derived features relevant to distinguishing different activities based on a degree to which values of derived features for one activity differ from values of derived features for other activities.

Identifying a presumed activity further includes computing, for each of the plurality of possible activities, a Gaussian likelihood model representing a probability that, given a particular activity, a specific set of abstract values is observed. Identifying a presumed activity further includes determining, for each of the plurality of possible activities, a posterior probability that a particular activity is occurring given the one or more abstract values. The posterior probability is based at least in part on at least one of a frequency that the particular activity occurs during normal use of the mobile device based on empirical data of prior occurrences of the particular activity, a presence of an external power source connected to the mobile device, a current speed of movement of the mobile device based on global positioning system data, or a presence of at least one vehicular peripheral device connected to the mobile device. The posterior probability for a particular activity is determined by including the Gaussian likelihood model and a prior probability density for the particular activity as inputs into a Bayesian filter, the prior probability density representing a probability that the particular activity is occurring at a given time based on prior contextual data. The prior contextual data includes at least one of a prior presumed activity determined for sensor values received during a previous period of time. The presumed activity is identified by selecting a particular activity associated with a highest posterior probability compared to each activity for which a posterior probability is determined.

The derived values are represented in a base feature vector and the abstract values are represented in a transformed feature vector, wherein the transformed feature vector is obtained after applying a linear discriminant analysis transformation matrix to the base feature vector. The plurality of possible activities are grouped into at least two different tiers, wherein generating abstract values to determine a presumed activity belonging to a first tier includes applying a first linear discriminant analysis transformation matrix to the base feature vector, and wherein generating abstract values to determine a presumed activity belonging to a second tier includes applying a second, different linear discriminant analysis transformation matrix to the base feature vector. Identifying a presumed activity further includes determining a level of similarity between the one or more abstract values and expected values of each activity in the first tier that correspond to the one or more abstract values; and if the level of similarity associated with each activity in the first tier fails to exceed a predefined minimum level of similarity, determining a level of similarity between one or more different abstract values and expected values of each activity in the second tier that correspond to the one or more different abstract values. The plurality of derived values correspond to derived features representing different characteristics of detected motion associated with the mobile device, the derived features including at least one of a mean magnitude, a variance of magnitude, a number of zero crossings, a mean tilt angle, a variance of tilt angle, energy associated with a magnitude frequency band, or energy associated with a tilt angle frequency band.

In a second general aspect, a computer program product is tangibly embodied in a computer-readable storage medium and includes instructions that, when executed, receives a plurality of sensor values detected by one or more sensors onboard a mobile device over a period of time. A base feature vector including a plurality of derived values determined from the plurality of sensor values is calculated. The base feature vector is transformed into an abstract feature vector, the abstract feature vector including one or more abstract values determined based on combining derived values in the base feature vector. A presumed activity corresponding to the plurality of sensor values detected over the period of time is identified, the presumed activity identified from a plurality of possible activities based on a level of similarity between the one or more abstract values and expected values of each of the plurality of possible activities that correspond to the one or more abstract values.

Implementations can include any or all of the following features. The base feature vector is transformed into an abstract feature vector by applying a linear discriminant analysis transformation vector to the base feature vector, the linear discriminant analysis transformation vector configured to transform derived values into abstract values associated with abstract features. The abstract features are identified based on a degree to which values of the abstract features for one activity differ from values of the abstract features for other activities.

In a third general aspect, a mobile device comprises a sensor operable to receive a plurality of sensor values over a period of time. The mobile device further includes a transformation module operable to calculate a plurality of derived values from the plurality of sensor values and selectively combine the derived values to generate one or more abstract values. The mobile device further includes a classifier module operable to identify a presumed activity corresponding to the plurality of sensor values detected over the period of time, the presumed activity identified from a plurality of possible activities based on a level of similarity between the one or more abstract values and expected values of each of the plurality of possible activities that correspond to the one or more abstract values.

Implementations can include any or all of the following features. The sensor is an accelerometer. Identifying a presumed activity further includes computing, for each of the plurality of possible activities, a Gaussian likelihood model representing a probability that, given a particular activity, a specific set of abstract values is observed.

Particular embodiments of the subject matter described in this specification can be implemented so as to realize one or more of the following advantages. Collected sensor data, such as data from an accelerometer, can be used for determining an activity associated with a mobile device (e.g., an activity of a user carrying the mobile device and/or a placement of the device on the user or in a vehicle). Raw accelerometer data is represented as derived features to provide for efficient analysis of motion patterns. Linear discriminant analysis may be used to further reduce the feature dimensions to easily identify abstract features of motion patterns that distinguish one activity from other activities while discounting or disregarding variations in accelerometer data that are unreliable or irrelevant to identifying a particular activity. Reducing feature dimensionality can also minimize the computational demands required for determining presumed activity associated with mobile devices.

In some instances, some derived features may provide values that easily distinguish certain activities while other derived features are better suited for distinguishing among other activities. Accordingly, implementation of a tiered activity classifier may improve efficiency of determining whether detected motion corresponds to activities in one tier by looking at only derived features specifically identified for activities in that tier. Different derived features may be considered when determining whether detected motion corresponds to activities in another tier.

The details of one or more embodiments of the invention are set forth in the accompanying drawings and the description below. Other features of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
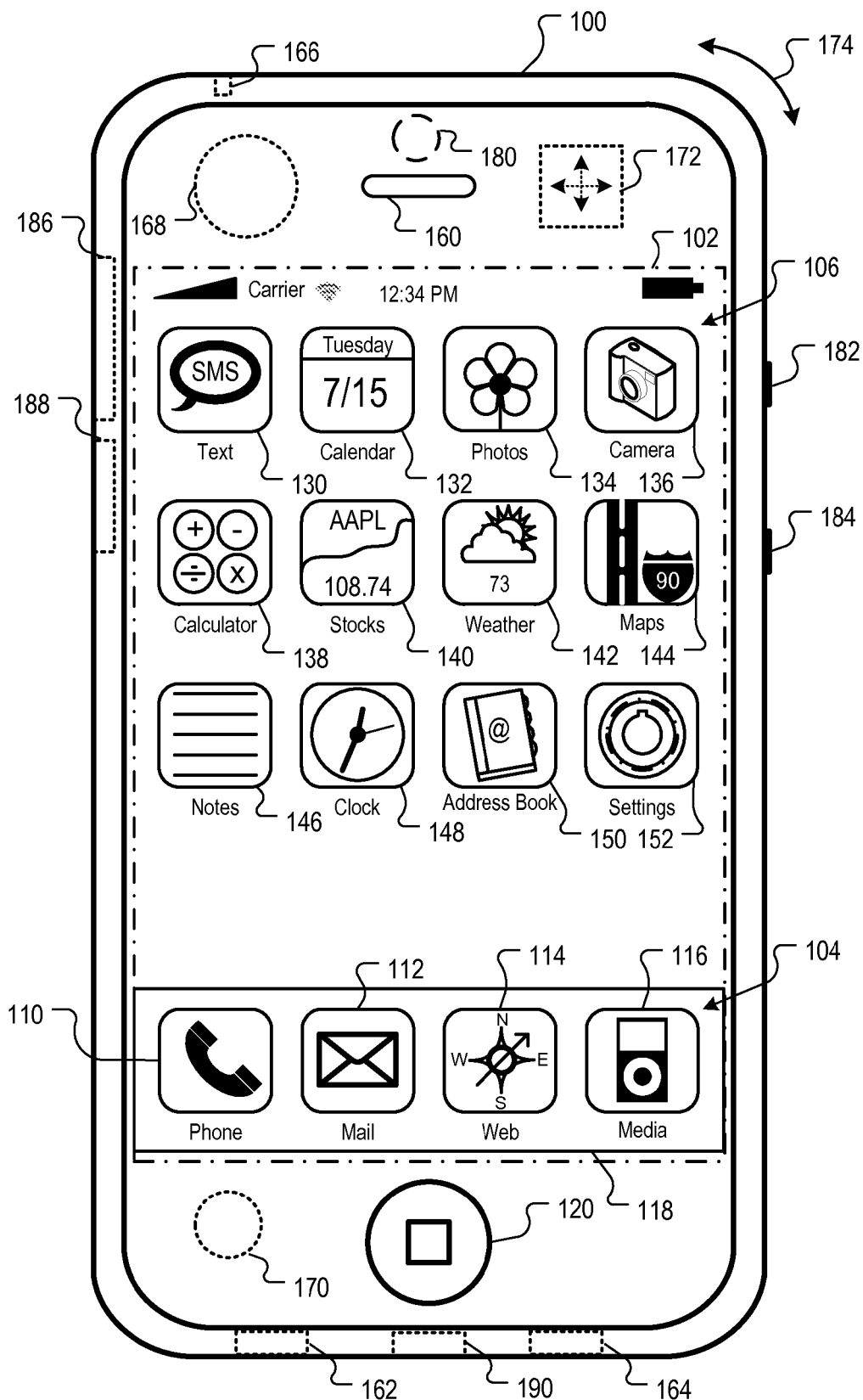
FIG. 1 is a block diagram of an example mobile device.

This specification generally describes the use of data collected by sensors of a mobile device, and other data associated with the mobile device, to determine an activity of a user of the mobile device or of a vehicle in which the mobile device is located. The sensor data can be used to determine a motion state of the mobile device and to characterize a type of motion that the mobile device is currently undergoing. Based on the motion state of the mobile device and other available data, a presumed activity of a user of the mobile device is determined. For example, accelerometer data collected by the mobile device may indicate that the device is moving horizontally at a steady rate with some degree of vertical motion in a periodic fashion. The detected motion of the mobile device may be compared with available motion patterns that are empirically associated with different activities to identify a likelihood that the detected motion corresponds to a particular activity.

As one example, a detected motion may most likely correspond to motion empirically associated with a user running with the mobile device. Motion data can be empirically associated with running, for example, using training data obtained from devices carried by users that are running. Other data available to the mobile device, such as GPS data indicating or confirming the mobile device's horizontal speed or prior samples of collected accelerometer data (e.g., collected in one or more sample periods immediately preceding a current sample period), can also be used to determine the overall probability that the user is running with the mobile device at a particular moment. Based on the likelihood that the detected motion pattern of the mobile device corresponds to running and the overall probability that the user is currently running, the "running" activity class may be selected for the particular time span during which accelerometer data was collected. In some implementations, certain settings, applications, interfaces, or events may be initiated or altered based on the presumed activity class of the mobile device.

The empirical data used to determine the likelihood of an activity associated with detected motion patterns is collected from prior samples of collected data. In some instances, a training phase is implemented in a controlled environment to collect samples of sensor data for known activities. For example, multiple samples of accelerometer data can be collected from a mobile device undergoing motions from the same activity. A set of derived values can be calculated from the accelerometer data, with each derived value corresponding to a particular feature of the detected motion of the mobile device. Examples of different derived values can include the mean magnitude of motion, variance of the magnitude, tilt angle, variance of the tilt, frequency of the magnitude, and the like. The derived values calculated for one activity are then compared with derived values of other activities to determine which derived values are better suited for differentiating between classes of activities. In certain implementations, linear discriminant analysis (LDA) is used to identify a combination of features that best characterizes or separates two or more classes of activities.

In some instances, an activity class can be distinguished from other activity classes with relative confidence based on a particular combination of features. Certain activity classes, however, may be relatively difficult to distinguish based on the same combination of features. Accordingly, activity classes may be grouped into two or more tiers based on the particular combination of features that best distinguishes activities in the same tier, where a first feature analysis tier is used to detect a first set of activities and a second feature analysis tier is used to detect a second set of activities. Further, the sensor data collected during the training phase may also be used to compute the likelihood that a particular set of derived values for a combination of features is present in the collected data given a particular class of activity. For example, Gaussian likelihood models may be defined for each combination of features identified using linear discriminant analysis of collected training data. The empirical data, in combination with other contextual information, may then be used to determine an expected activity associated with a mobile device.

The examples in the present specification describe the use of data collected from an accelerometer of a mobile device. Data from other sensors on the mobile device may also be used to detect motion of the mobile device and determine a presumed activity associated with the mobile device. In some instances, accelerometer sensors can be used in combination with other sensors, such as a three-axis gyroscope or magnetometer, for example, to obtain data for determining a presumed activity based on motion patterns of a mobile device. Accordingly, collecting and analyzing data collected from sensors other than accelerometers are also included in the scope of this specification.

Mobile Device Overview

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more of these data processing devices or other data processing devices. Although the description below refers generally to mobile device 100, any computing device, including a laptop or tablet, may be used in accordance with the features described in the present disclosure.

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user. The touch-sensitive display 102 can comprise a multi-touch-sensitive display 102. A multi-touch-sensitive display 102 can, for example, process multiple simultaneous touch points, including processing data related to the pressure, degree and/or position of each touch point.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. Each of the display objects 104, 106 can be a graphic representation of a system object. Some examples of system objects include device functions, applications, windows, files, alerts, events, or other identifiable system objects.

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular device objects 104, e.g., the phone object 110, the e-mail object 112, the Web object 114, and the media player object 116, can be displayed in a menu bar 118. In some implementations, each of the device functionalities can be accessed from a top-level graphical user interface, such as the graphical user interface illustrated in FIG. 1. The objects 110, 112, 114 and 116 represent visual indicators of applications on the mobile device 100. Touching one of the objects 110, 112, 114 or 116 can, for example, invoke the corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., via Wi-Fi) to other wireless devices in the vicinity. For example, mobile device 100 can be configured as a base station for one or more devices. As such, mobile device 100 can grant or deny network access to other wireless devices.

In some implementations, upon invocation of particular device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS), other global navigation satellite system, or other positioning system (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device, 186, and/or a Bluetooth™ communication device 188. Other communication protocols can also be supported, including other 802.x communication protocols (e.g., WiMax, Wi-Fi), code division multiple access (CDMA), global system for mobile communications (GSM), Enhanced Data GSM Environment (EDGE), 3G (e.g., EV-DO, UMTS, HSDPA), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, a personal computer, a printer, or other processing devices capable of receiving and/or transmitting data. In some implementations, the port device 190 allows the mobile device 100 to synchronize with a host device using one or more protocols.

Network Operating Environment

Figure 2:
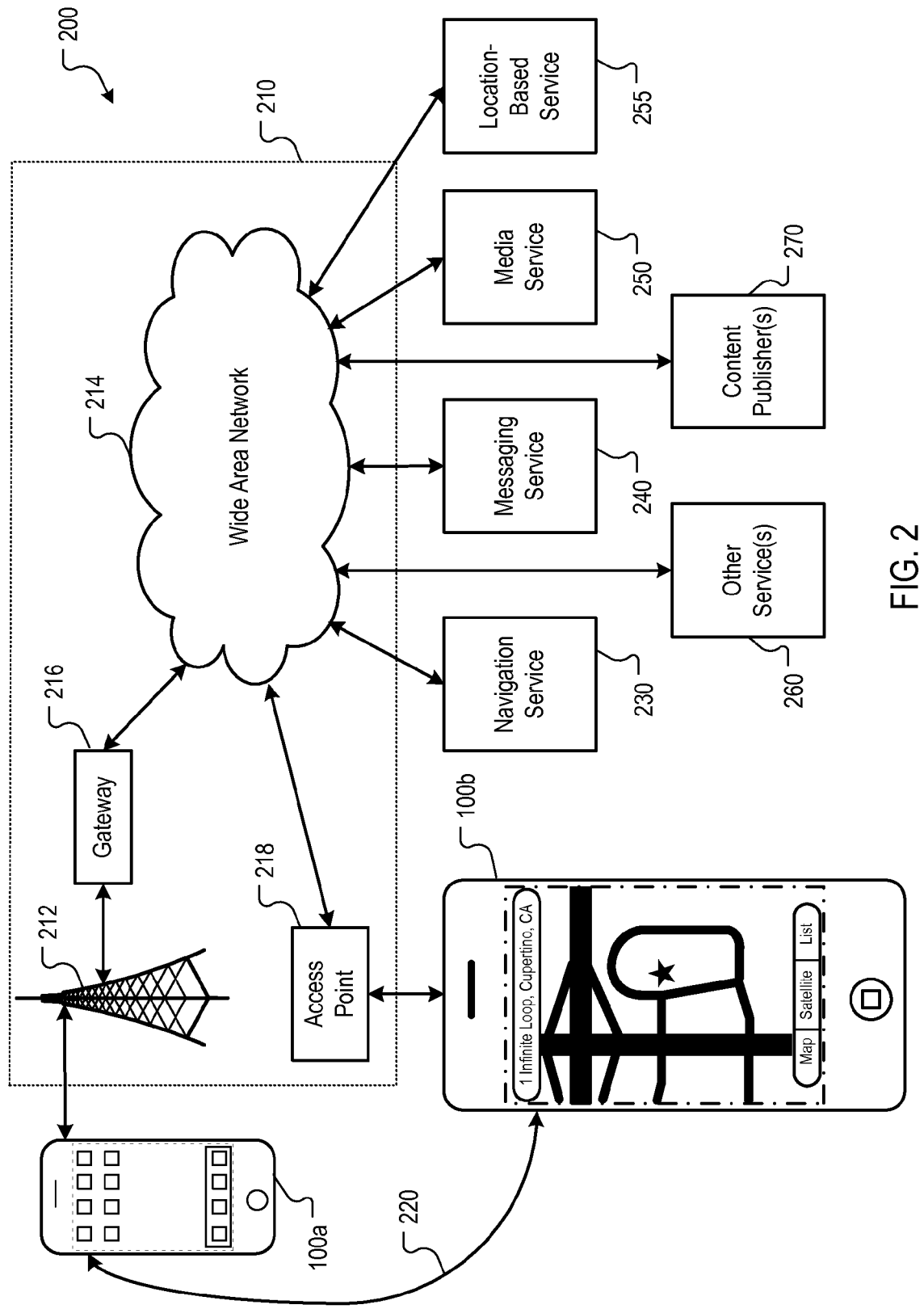
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 1006 can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 255, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by touching the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. A location-based service 255 can, for example, provide data or content based on a current location of the mobile device 100. One or more other services 260 can also be utilized by the mobile device 100, including a syncing service, an activation service and a software update service that automatically determines whether software updates are available for software on the mobile device 100, then downloads the software updates to the mobile device 100 where the updates can be manually or automatically unpacked and/or installed.

The mobile device 100 can also access other data over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Figure 3A:
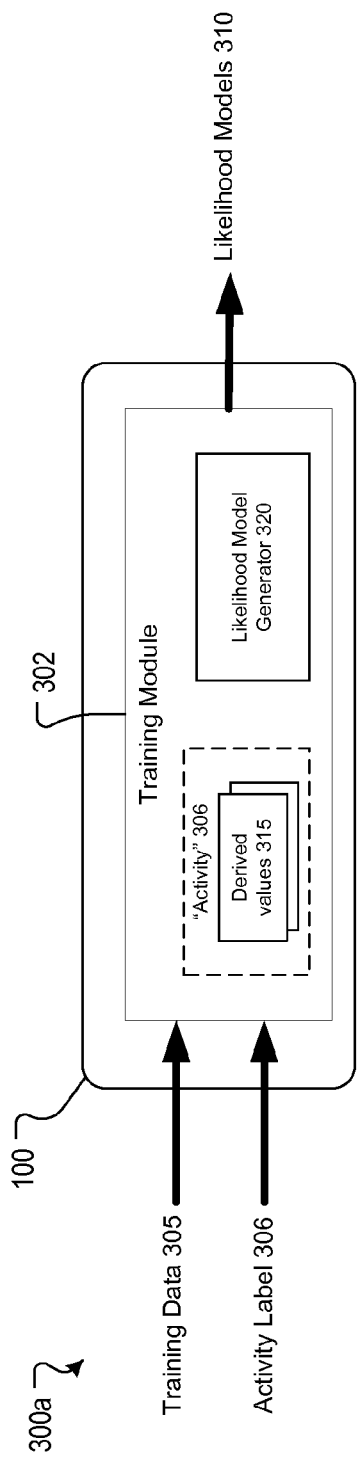
FIG. 3A is a block diagram of an example training module for processing training data used to determine presumed activity.

Exemplary Processes for Determining Expected Activity Associated with a Mobile Device FIG. 3A is a block diagram 300a of an example training module 302 for obtaining empirical data during a training phase for computing likelihood models used to determine a presumed activity based on motion patterns of a mobile device 100. As used in the present specification, a presumed activity is an activity associated with a motion pattern of the mobile device 100 as determined by modules onboard the mobile device 100. A particular activity may be inferred based on data collected during a specific time window by sensors on the mobile device 100, including accelerometer data. The particular inferred activity is "presumed" to be the current activity occurring during the time window if the motion pattern of the mobile device 100 matches known motion patterns associated with the presumed activity. The presumed activity may be performed by a user of the mobile device 100, for example. The presumed activity may also be any activity associated with the mobile device 100 that is currently occurring, whether performed by a user or not (e.g., a mobile device mounted on a moving object may be associated with a presumed activity of "driving," regardless of whether a user is actually driving a vehicle).

In general, data is collected during a training phase to generate likelihood models so that motion data received outside of the training phase can be compared to motion data collected for known activities during the training phase (represented in the likelihood models). As depicted in FIG. 3A, training data 305 is collected and fed into a training module 302. The training data 305 can comprise previously-collected sample accelerometer data obtained in a controlled environment. In some implementations, training data 305 is collected on a mobile device 100 of the same type as the type of mobile device on which presumed activity may later be determined outside of the training phase. The training data 305 is passed through a training module 302, which associates certain derived values 315 characterizing the motion of a mobile device 100 with certain activities, as described in further detail below in connection with FIG. 4. In particular, the training phase is implemented in a controlled environment in which a current activity associated with a mobile device 100 is known, and training data 305 is collected for that activity. Accordingly, a particular activity label 306 may be input into the training module 302, wherein the activity label 306 indicates the current activity for which training data 305 is being collected. Each derived value 315 calculated from the training data 305 is associated with the activity indicated in the activity label 306. A likelihood model generator 320 in the training module 302 calculates likelihood models 310 that define the likelihood that certain features are present or have particular values when the mobile device 100 is associated with a particular activity. In particular, certain combinations of derived values 315 associated with an activity may be used to differentiate between the activity and other possible activities. The likelihood models 310 generated by the likelihood model generator 320 define a likelihood that an observed combination of derived values 315 corresponds to a particular activity. The likelihood models 310 can be used to determine a presumed activity based on accelerometer data collected by a mobile device 100 after the training phase is complete.

Figure 3B:
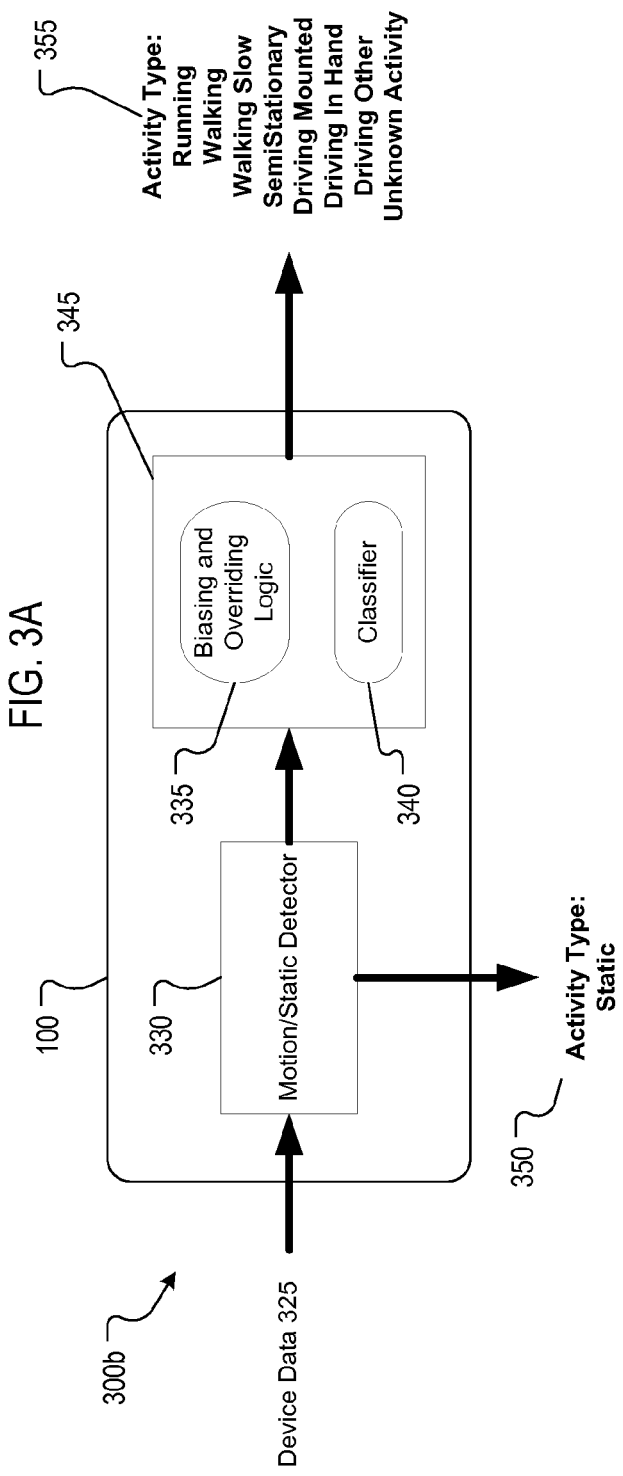
FIG. 3B is a block diagram of example modules of a mobile device for classifying detected motion as a one of a plurality of possible activities.

FIG. 3B is a block diagram 300b of example modules in a mobile device 100 for determining a presumed activity type within a time window based on data associated with the mobile device 100, such as accelerometer data. As seen in FIG. 3B, mobile device data 325 collected within a particular time window is received at a motion/static detector 330 on the mobile device 100. The motion/static detector 330 determines whether the mobile device 100 is static or in motion during this time period. For example, detecting whether the mobile device 100 is in motion or is static can be determined, for example, using GPS data, cellular signals, and/or changes in accelerometer readings. If the mobile device 100 is static, the activity type for the mobile device 100 during the time window is designated as static 350. If the mobile device 100 is in motion, the data representing the motion is passed to an activity detection module 345 to identify a presumed activity based on the detected motion patterns. As seen in FIG. 3B, the activity detection module 345 may use a classifier 340 as well as biasing and overriding logic 335 to determine an activity type associated with the detected data 325. The classifier 340 assigns a particular activity class, such as walking, running, or driving, for example, to data received within a time window.

In some implementations, the classification of detected motion as determined by the classifier 340 may be confirmed, changed, or refined by biasing and overriding logic 335. The biasing and overriding logic 335 can include logic for determining whether certain factors are present within the time window in which device data 325 is received that may affect the probability that the activity class assigned by the classifier 340 matches the actual activity occurring during the time window. For example, although the classifier 340 may classify the detected motion as associated with a pedestrian activity based on motion patterns, the presence of an external power source currently connected to the mobile device 100 may significantly decrease the probability that a user is running or walking with the mobile device 100. In general, the likelihood models 310 generated during a training phase, as described above in connection with FIG. 3A, are used in combination with other probability models based on other contextual data associated with the mobile device 100, as defined in the biasing and overriding logic 335, to determine the presumed activity class.

Different activity classes 355 may be associated with a user of the mobile device 100 based on different motions of the mobile device 100. Possible activities based on motion data for the mobile device 100 can include pedestrian activities such as running, walking at a normal speed, or walking slowly, for example. The classifier 340 may also be configured to distinguish different activities within the same, general context. For example, the classifier 340 may not only determine that the motion of the mobile device 100 suggests vehicular activity (i.e., the user is driving), but also whether the mobile device 100 is mounted while the user is driving, held in the hand of the user while the user is driving, laying on a seat, or associated with another, unidentified motion state while the user is driving. Further, the classifier 340 may not determine a specific activity class for a given set of sampled data but may still rule out certain activities based on the motion data. In some instances, for example, the classifier 340 may determine that the mobile device is associated with a semi-stationary activity. If the classifier 340 is unable to determine a particular activity class for the received device data 325, the classifier 340 may designate the activity type as an unknown activity.

Figure 4:
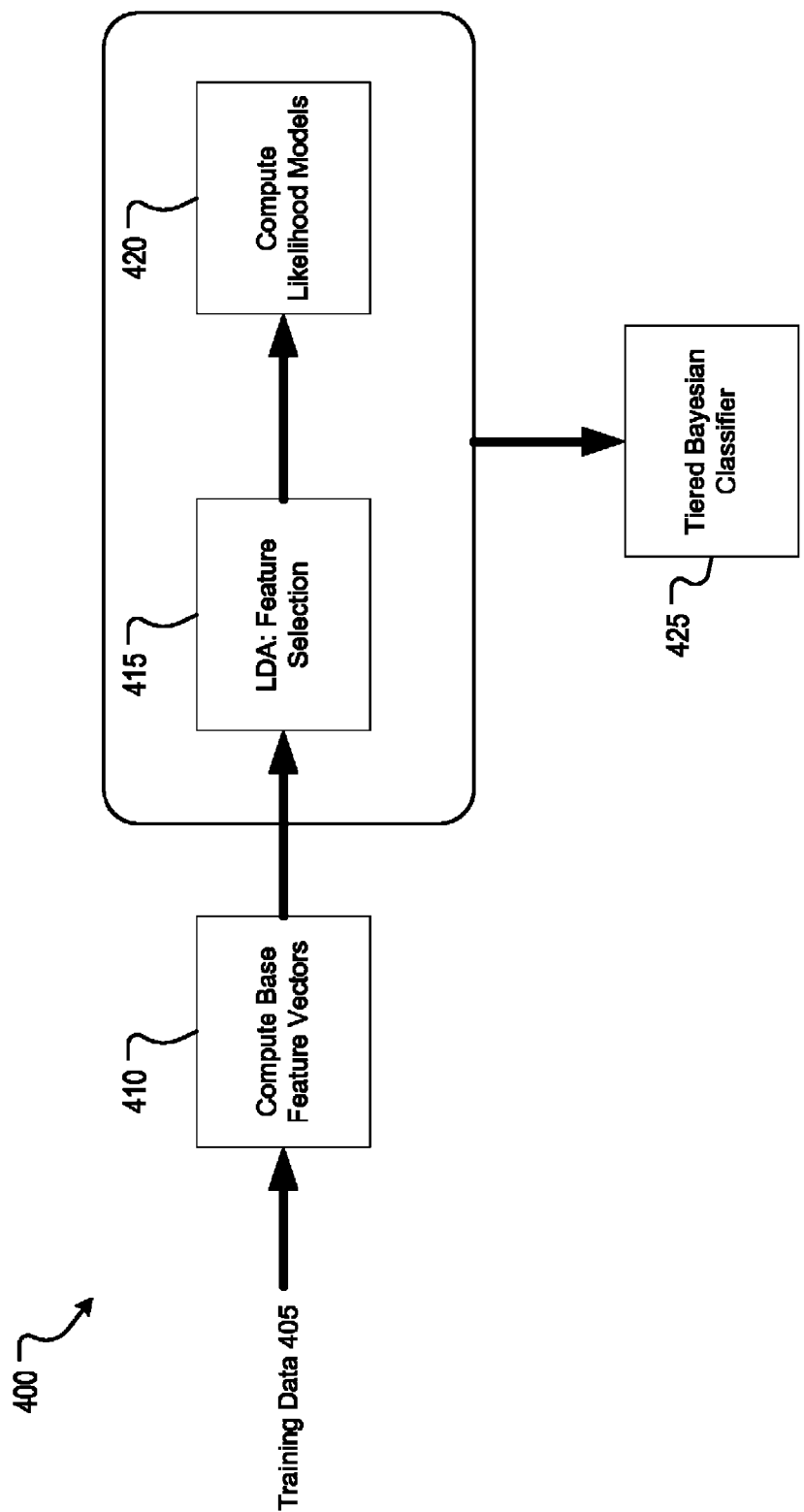
FIG. 4 is an example block diagram of a process for computing abstract features and likelihood models used to determine a presumed activity.

FIG. 4 is a block diagram of an example process 400 for obtaining and analyzing training data 405 during a training phase for computing likelihood models used to determine presumed activity based on motion patterns of a mobile device 100. Training data 405 can include accelerometer data collected while the mobile device 100 is subjected to certain motions associated with different activities, such as running, walking, driving, bicycling, or stationary, for example.

The output of a triaxial accelerometer sensor can be defined by Equation 1, for example, $$a = \begin{bmatrix} a_x \\ a_y \\ a_z \end{bmatrix}$$

where "a" is the vector containing its components in three axes, $a_x$, $a_y$, and $a_z$.

Training data sets are collected from sensors for known motion classifications. For example, during the training phase, a mobile device 100 can be subjected to motions associated with running by having a user run with the mobile device 100 (or potentially by using automated methods simulating a running motion). The data from the accelerometer sensors of the mobile device 100 collected while the mobile device 100 is subjected to the running motion is automatically associated with the "running" activity class. The training data can be specific to device type. In other words, training data can be collected and processed for each of different types of mobile devices because, in some instances, separate feature statistics for the different types of devices may provide better motion recognition performance.

From the training data 405 that includes collected accelerometer data, base feature vectors are calculated at 410. Instead of analyzing raw accelerometer samples, base feature vectors are calculated to quantify and categorize the collected accelerometer data into different derived features that characterize the detected motion of a mobile device. In other words, the base feature vectors are comprised of derived features representing different characteristics of the motion patterns captured in the collected accelerometer data. Examples of derived features can include magnitude of motion, the number of times crossing a zero axis, tilt angle of the mobile device, frequency domain features such as the energy associated with a particular frequency band, and the like. Further, in some implementations, a mean value, $\mu$, and a variance, $\sigma$, are determined for some derived features with the assumption that the feature has a Gaussian distribution.

In certain instances, the energy associated with each frequency band represents a different feature. For example, the energy associated with a frequency band between 0 and 6 Hz may be defined as one derived feature, the energy associated with a frequency band between 6 and 9 Hz may be defined as a second derived feature, and so on. The energy associated with the different frequency bands may be based on power spectral density computations from a window of accelerometer magnitudes and tilt angles. For example, for each window of accelerometer readings, where each reading contains the accelerometer values for each component of the signal vector in the x, y, and z axes at a particular time instant, and each window includes a particular number of readings N, the corresponding magnitude and instantaneous tilt angle for each reading/sample in the window is calculated. As a result, N magnitude values and N tilt angles are calculated per window. The discrete Power-Spectral-Density values of N magnitude values and N tilt angle values are calculated for frequency bands within a particular range. In order to reduce the number of frequency features, the frequency range may be divided into sub-ranges/buckets (e.g., 0-3 Hz, 3-6 Hz, 6-15 Hz, etc.). The magnitude or tilt angle frequency values in each of the buckets are then integrated so that each bucket has a single frequency feature value.

Each of the derived features described above may be associated with a numerical value, referred to as a derived value, calculated from the raw accelerometer data. A set of derived values is calculated for a specific window of sensor samples. In some implementations, derived values associated with thirty or more derived features can be calculated for each set of sensor samples. In order to generate a likelihood model that distinguishes between activities based on detected motion patterns, however, the set of derived values may be analyzed using linear discriminant analysis (LDA) at 415 to identify which derived features associated with the derived values are representative of a particular activity and that are good at distinguishing between different activities. Linear discriminant analysis may also be used to identify linear combinations of derived values to obtain an abstract value that is useful in discriminating between activities. As used in this specification, a derived value is a value of a derived feature calculated from raw accelerometer data and representing a characteristic of a motion pattern reflected in the accelerometer data (e.g., magnitude, tilt angle, energy associated with frequency, etc.). An abstract value is a value associated with an abstract feature, wherein the abstract feature is a linear combination of certain derived features that distinguish a particular activity from other activities as determined by linear discriminant analysis. Accordingly, an abstract value may be a linear combination of certain derived values.

One result of using linear discriminant analysis is that certain derived features from the base feature vector may be combined into one or more abstract features, effectively reducing the number of derived values to be used in identifying a match between a set of derived values and a likelihood model. The smaller set of abstract values (when compared to the number of derived features in the initial base feature vector) can improve operational efficiency by reducing the amount of time and resources needed to compare derived features associated with collected accelerometer data and likelihood models for different activities.

In some implementations, an LDA transformation matrix generated during the training phase is used to combine the derived features into abstract features. The LDA transformation matrix is generated during a training phase by determining which combinations of derived features are most applicable for distinguishing between different activities. Application of the LDA transformation matrix to a base feature vector yields a transformed abstract feature vector that includes values associated with abstract features identified during a training phase as most relevant for discriminating certain activities.

In some instances, certain features are more suitable for distinguishing among a first group of activities while other features are more suitable for distinguishing among a second group of activities. Generally, linear discriminant analysis determines a set of "abstract features" that maximizes the differences in derived features between activities of different classes while minimizing the differences in derived features between activities within the same class. The abstract features produced by the linear discriminant analysis are linear combinations of original derived features and are independent from each other. Accordingly, the feature dimension of the base feature vector is reduced. The abstract features should contain the information relevant to subsequent classification while also being insensitive to irrelevant variations in data; the abstract features should also now have low dimensionality in order to minimize the computational demands of the classifier.

Different groups of activities may be defined based on the particular abstract features that distinguish activities in that group. Activities that are easily distinguished based on a first set of abstract features may be grouped into a first tier of activities while other activities that are not as easily distinguished based on the same set of abstract features may be grouped into a second tier of activities. For example, in certain implementations, a set of abstract features identified during the linear discriminant analysis may clearly distinguish the activities of running, walking (normal speed), driving (with mobile device mounted), and semi-stationary motion. Other activities, however, such as walking (slow speed), driving (with mobile device in hand), or driving (other activity) may not be easily identified by analyzing the same set of abstract features. Accordingly, the first group of activities can be included in a first tier while the second group of activities is included in a second tier. The tiered classification of groups of activities allows different combinations of derived features (i.e., different abstract features) to be analyzed for different tiers. The abstract features that are most suitable for distinguishing activities in the first tier are applied to determine likelihood models for those activities, while other abstract features or other parameters may be used to determine likelihood modes for activities in the second tier (or in other lower level tiers). In some implementations, the abstract values of the abstract features used in the first tier may be generated in a manner that not only provides relatively clear distinctions between activities in the first group of activities but also differentiates the first group of activities from the second group of activities (or any other activity groups in a subsequent tier).

The abstract features determined by the linear discriminant analysis as best suited for identifying a particular activity from among other activities are the features used to compute the likelihood model for that activity at 420. In certain implementations, a Gaussian likelihood model is computed for each activity class. The Gaussian likelihood model, in general, represents the likelihood that a particular transformed feature vector will be derived from collected accelerometer data given a particular activity. The Gaussian likelihood model may be represented by Equation 2

$$p(f \text{ given } x = c_i) = \frac{1}{\sqrt{(2\pi)^n |\Sigma_i|}} e^{-\frac{1}{2}(f-\mu_i)^T \Sigma_i^{-1}(f-\mu_i)}$$

where p is probability; x is a class variable (e.g., each class variable representing a particular activity class such as running, walking, etc.), with $x \in \{c_1, c_2, \ldots, c_i, \ldots, c_N\}$; f is a derived feature (i.e., an observation or measurement of a set of relevant quantities); p is a mean value of derived feature f, and $\Sigma$ is the covariance of derived feature f.

For example, the activity of running is associated with a particular Gaussian likelihood model that represents the likelihood that accelerometer data collected while a user is running will translate into a feature vector that matches the mean feature vector. In other words, the specific feature vector derived from actual accelerometer data collected while a user is running is compared to the distribution of the Gaussian likelihood model to determine a likelihood that the feature vector of the detected motion data represents motion corresponding to the running activity.

The training phase results in determination of a set of abstract features used to identify activities within each tier based on linear discriminant analysis and a likelihood model for each activity. As illustrated in FIG. 4, the results of the linear discriminant analysis and computation of the Gaussian likelihood models for each activity class are included as inputs into a tiered Bayesian classifier 425. As explained in further detail below with respect to FIG. 5, the tiered Bayesian classifier 425 is applied during analysis of actual data samples collected outside of the training phase when the user's activity is not determined yet to identify a presumed activity of the user. The Bayesian classifier 425 outputs the probability that received accelerometer data represents motion associated with a particular activity (i.e., a presumed activity of a user of a mobile device).

Figure 5:
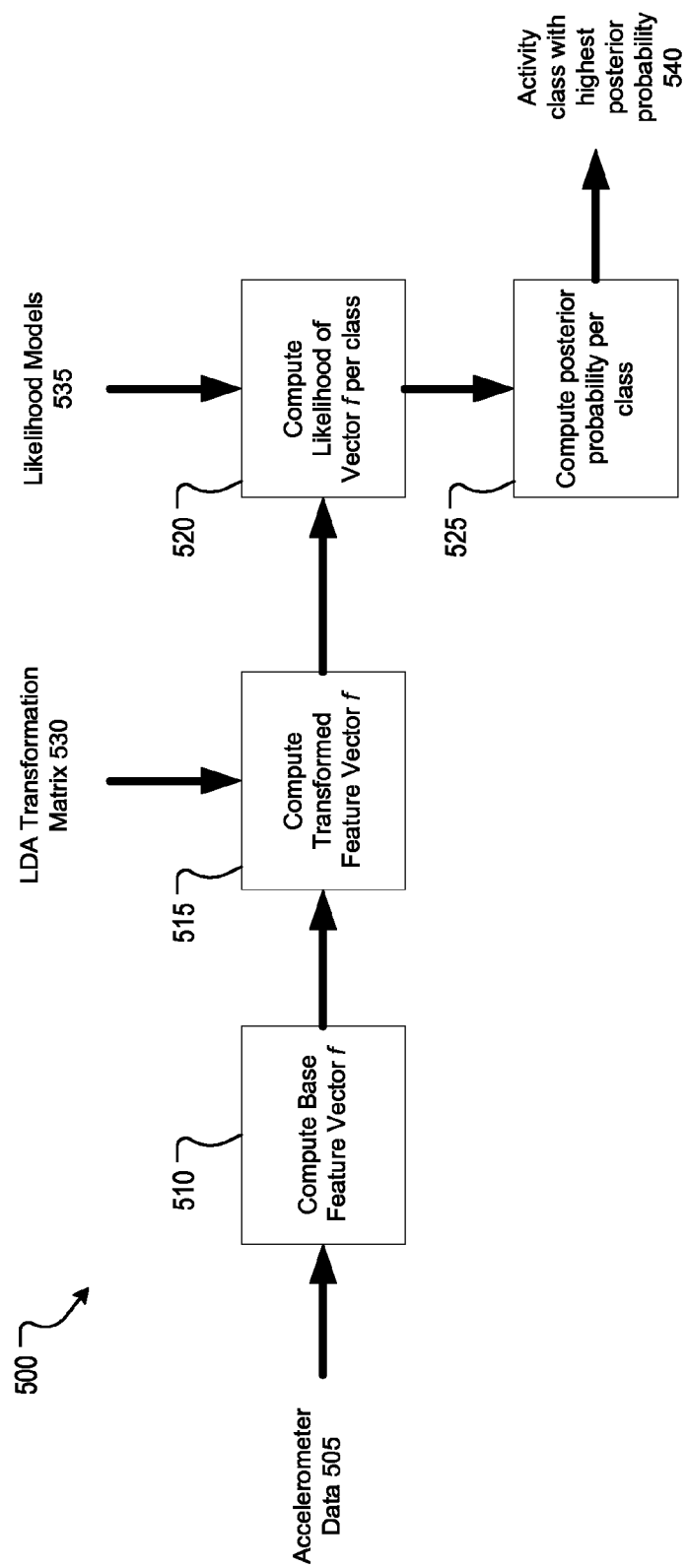
FIG. 5 is an example block diagram of a process for determining a presumed activity associated with a mobile device based on accelerometer data collected at the mobile device.

FIG. 5 depicts an example process 500 for determining a presumed activity type during a particular time window based on data associated with a mobile device 100. Accelerometer data detected by accelerometer sensors on a mobile device 100 is received. In some implementations, the accelerometer data is collected for time intervals of a particular length. For example, accelerometer data may be collected and analyzed every five seconds to determine a presumed activity for every five-second time window. As described above, the raw accelerometer data is used to compute a base feature vector at 510 representing values of each of the possible derived features that may be calculated based on received accelerometer data. The derived values calculated for real time data may correspond to derived features for which values were calculated during the training phase described above. In some implementations, derived values associated with thirty derived features can be calculated for a given sample of accelerometer data within a particular time window, including magnitude, the number of zero crossings, tilt angle of the mobile device, frequency domain features, energy in key spectral bands, and the mean and variance for the derived values, for example.

In certain implementations, an LDA transformation matrix 530 is applied to the base feature vector to compute a transformed feature vector at 515. The LDA transformation matrix 530 is generated during a training phase by determining which combinations of derived features are most applicable for distinguishing between different activities. Application of the LDA transformation matrix 530 to the base feature vector may yield a transformed feature vector that includes values associated with abstract features identified during a training phase as most relevant for discriminating certain activities. As described above, the abstract features may represent linear combinations of derived features, with particular weights given to each of the derived features depending on the relevance of a particular derived feature in distinguishing a particular activity from other activities.

In some implementations, the particular LDA transformation matrix 530 applied to the base feature vector corresponds with a particular tier. For example, in an initial analysis of received accelerometer data, the detected motion of the mobile device 100 is compared to expected motion corresponding to activities within a first tier. In some instances, the first tier is associated with activities which are easily distinguished based on a particular set of abstract features. If the abstract features of the detected motion do not correspond to abstract features of known activities in the first tier by at least a threshold amount, the abstract features of the detected motion may be compared to activities in a second tier associated with different abstract features from a different LDA transformation matrix. Accordingly, the LDA transformation matrix 530 associated the current tier is applied to the base feature vector for activities in that tier. A different LDA transformation matrix may be applied to the base feature vector for activities in a different tier.

The likelihood models 535 generated during the training phase are applied to the transformed feature vector to compute the likelihood that the transformed feature vector is associated with a particular activity at 520. Each activity class defined during the training phase is associated with a different likelihood model 535. Accordingly, multiple likelihood models may be applied to the transformed feature vector to determine the likelihood that the transformed feature vector is associated with each of the different activities. If the determination of presumed activity is performed in stages based on predefined tiers, the likelihood models are applied for each activity in the current tier.

The overall probability, or posterior probability, that motion detected during a time window corresponds to a particular activity is computed at 525 based on results of the likelihood computation as well as other data. In some implementations, a Bayesian filter is used to compute the posterior probability per class. The Bayesian filter may be given by Equation 3 below, $$p_{x|y=b}(a) = \frac{p_{y|x=a}(b)p_x(a)}{p_y(b)}$$

where $p_{x|y=b}(a)$ is the posterior probability density of x evaluated for class a, a random variable, given an observation of y=b; and p(a) is the prior probability density of x evaluated for class a. The prior probability density corresponds to the probability that a particular activity is actually occurring during the time window in which the accelerometer data is collected based on the presumed activity identified during a prior time window. For example, since accelerometer data can be collected for successive time windows, the presumed activity in a previous time window or in a sequence of previous time windows may mean a greater probability that the activity performed in the current time window is the same as the activity performed in previous time windows. Accordingly, presumed activity associated with previous time windows may be factored into the prior probability density.

The posterior probability of a particular activity class may also be based on other a priori information or contextual information associated with the mobile device 100. For example, GPS information may indicate the speed at which the mobile device 100 is moving, suggesting that the mobile device 100 may be located in a car if the speed of movement is greater than a certain amount. In some instances, a wireless car-kit may be attached to the mobile device 100, further suggesting that the user may be driving a car. In certain situations, if the mobile device 100 is connected to an external power source at a particular point in time, certain pedestrian activities such as walking and running can be eliminated or assigned very low probabilities as potential activities during the present time window.

Other factors may be included in the Bayesian filter for determining the posterior probability, such as indications that the mobile device 100 undergoes short transitions from moving to static motion states. In another example, the Bayesian filter also factors in empirical data showing the probability that a particular activity is being performed at any given time during a day. The empirical data may include data concerning the amount of time, on average, a particular activity is performed per day, either with respect to a plurality of users or with a specific user. In other words, a priori information other than data collected from a sensor may also provide an indication of what the presumed activity might be or to rule out certain activities and, accordingly, can be included in the Bayesian filter to help determine a presumed activity.

In Equation 3, $p_{y|x=a}(b)$ is the observation probability density evaluated at the observation given a particular class a. In the context of determining presumed activity, it is the probability that, given a particular activity, a particular feature vector is observed based on the likelihood models generated during the training phase. In the Bayesian filter, the observation probability density is multiplied by the prior probability density and then divided by the marginal density function of y, $p_y(b)$. The marginal density function is a normalizing factor, so it is computed over all possible classes by Equation 4, $$p_y(b) = \int_A p_{y|x=a}(b)p_x(a)$$

The posterior probability for each class is computed using the Bayesian filter of Equation 3. Accordingly, for each possible activity class, the Bayesian filter outputs a probability that a particular activity is being performed by a user of a mobile device based on the collected accelerometer data during a particular time window. The activity class with the highest posterior probability 540 is selected as the presumed activity for a set of accelerometer data.

In some implementations, a minimum threshold posterior probability is required before a presumed activity is selected. If the activity class with the highest posterior probability in a particular iteration does not satisfy the minimum threshold probability, the posterior probability for other activity classes may be calculated and/or other derived features may be used to calculate the posterior probability. For example, if the activity classes in a first tier do not yield at least one posterior probability satisfying a minimum threshold probability, activity classes in a second tier may be used to determine a presumed activity. The process for determining posterior probability for activities in a second tier may involve not only calculating posterior probabilities for different activities but also analyzing different derived features of activities in the second tier based on different linear discriminant analysis results. Other tiers and activity classes may also be available for additional iterations of determining posterior probabilities that satisfy a minimum probability requirement. In some instances, the highest calculated posterior probability for all available activity classes may not meet the minimum threshold probability, and the presumed activity is accordingly set as "unknown activity."

Figure 6:
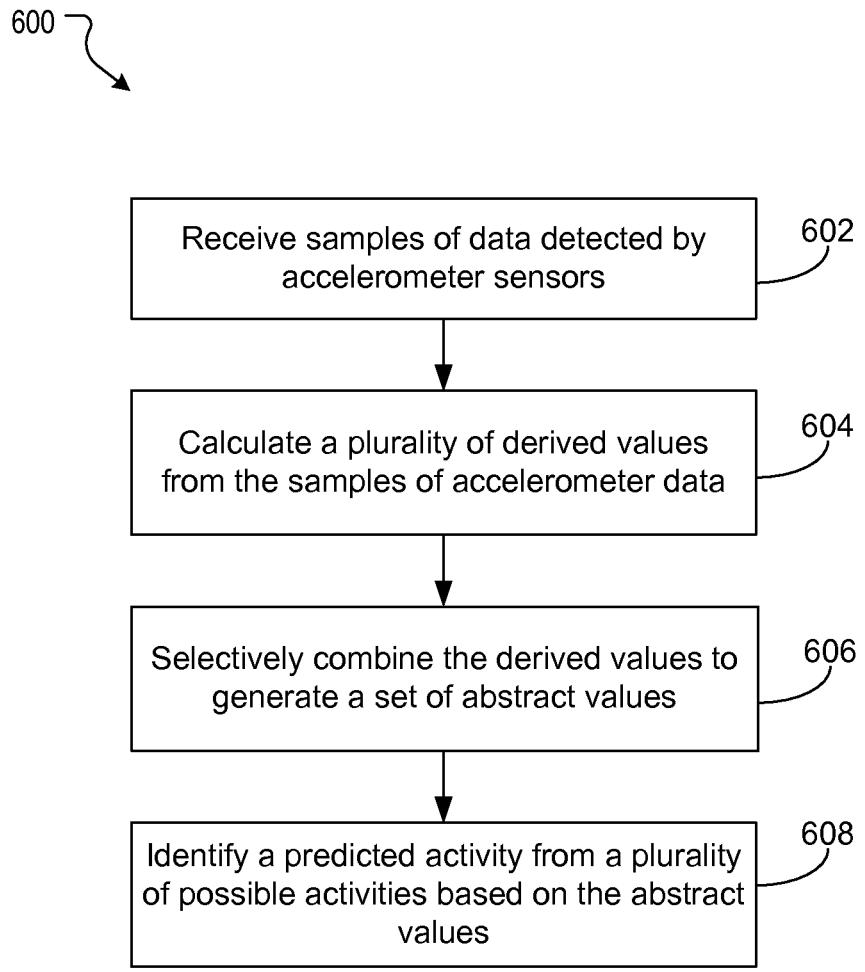
FIG. 6 is a flow diagram of an example process for determining a presumed activity associated with a mobile device.

FIG. 6 is a flowchart of an example process 600 for identifying a presumed activity based on accelerometer data detected on a mobile device. Samples of data detected by accelerometer sensors are received at 602. A plurality of derived values is calculated from the samples of accelerometer data at 604. The derived values are selectively combined to generate a set of abstract values at 606. A presumed activity is identified from a plurality of possible activities based on the abstract values at 608.

Figure 7:
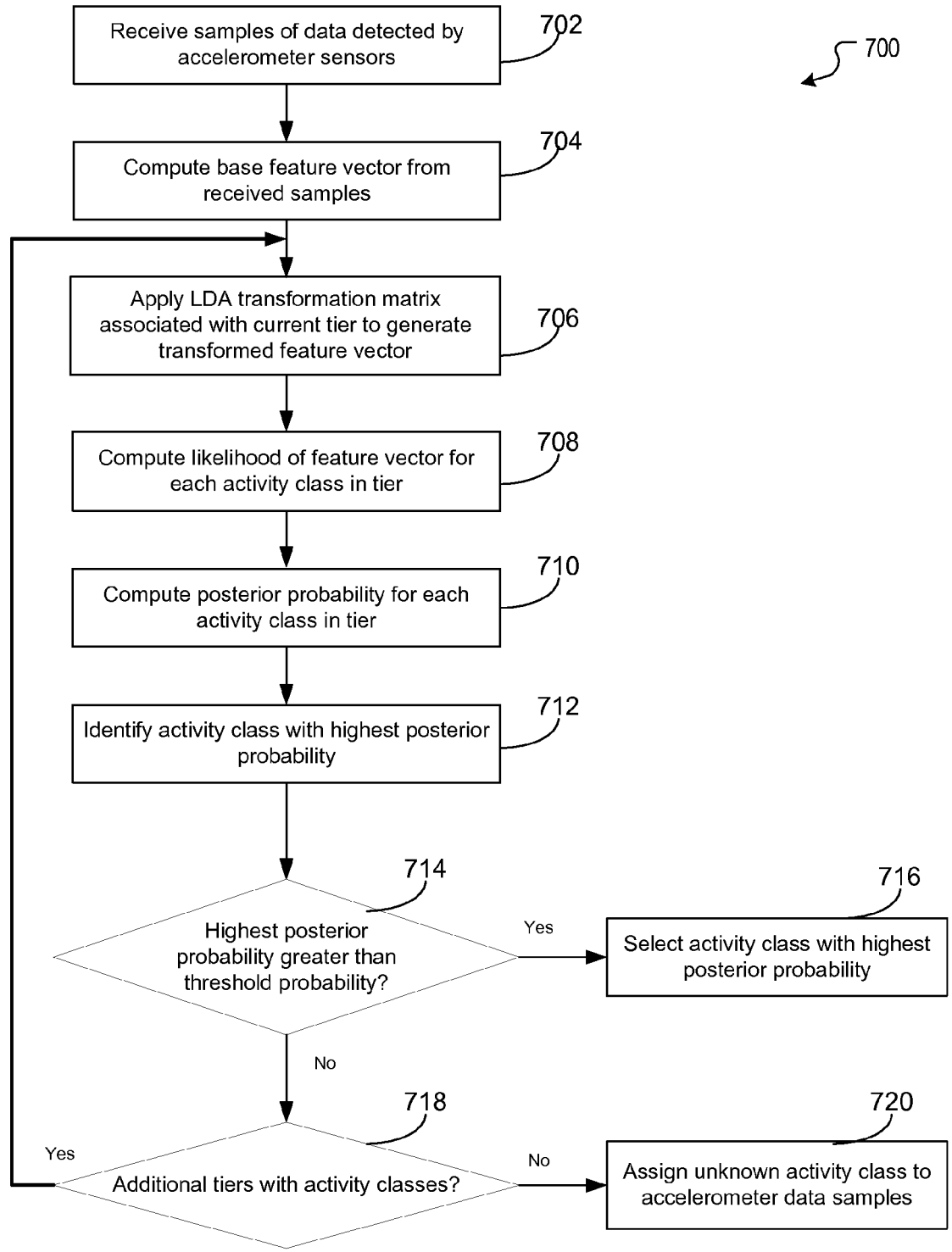
FIG. 7 is a flow diagram of an example process for determining a presumed activity associated with a mobile device in a tiered implementation.

FIG. 7 is a flowchart of an example process 700 for identifying a presumed activity from among a plurality of possible activities that are grouped into multiple tiers. Samples of data detected by accelerometer sensors are received at 702. A base feature vector is computed from the received samples at 704. An LDA transformation matrix associated with a current tier of activities is applied to generate a transformed feature vector at 706. The likelihood of the feature vector present for each activity class in the current tier is computed at 708. The posterior probability for each activity class in the current tier is computed at 710. The activity class with the highest posterior probability is identified at 712.

A determination of whether the highest posterior probability in the tier is greater than a threshold probability is performed at 714. If the highest posterior probability is greater than the threshold probability, the activity class associated with the highest posterior probability is selected at 716. If the highest posterior probability is not greater than the threshold probability, a determination is made whether additional tiers with activity classes are available at 718. If no other tiers of activity classes are available, the accelerometer data samples are assigned an "unknown" activity class at 720. If another tier of activity classes is available for analysis, the process 700 returns to applying a particular LDA transformation matrix associated with the second tier to generate a transformed feature vector.

Figure 8:
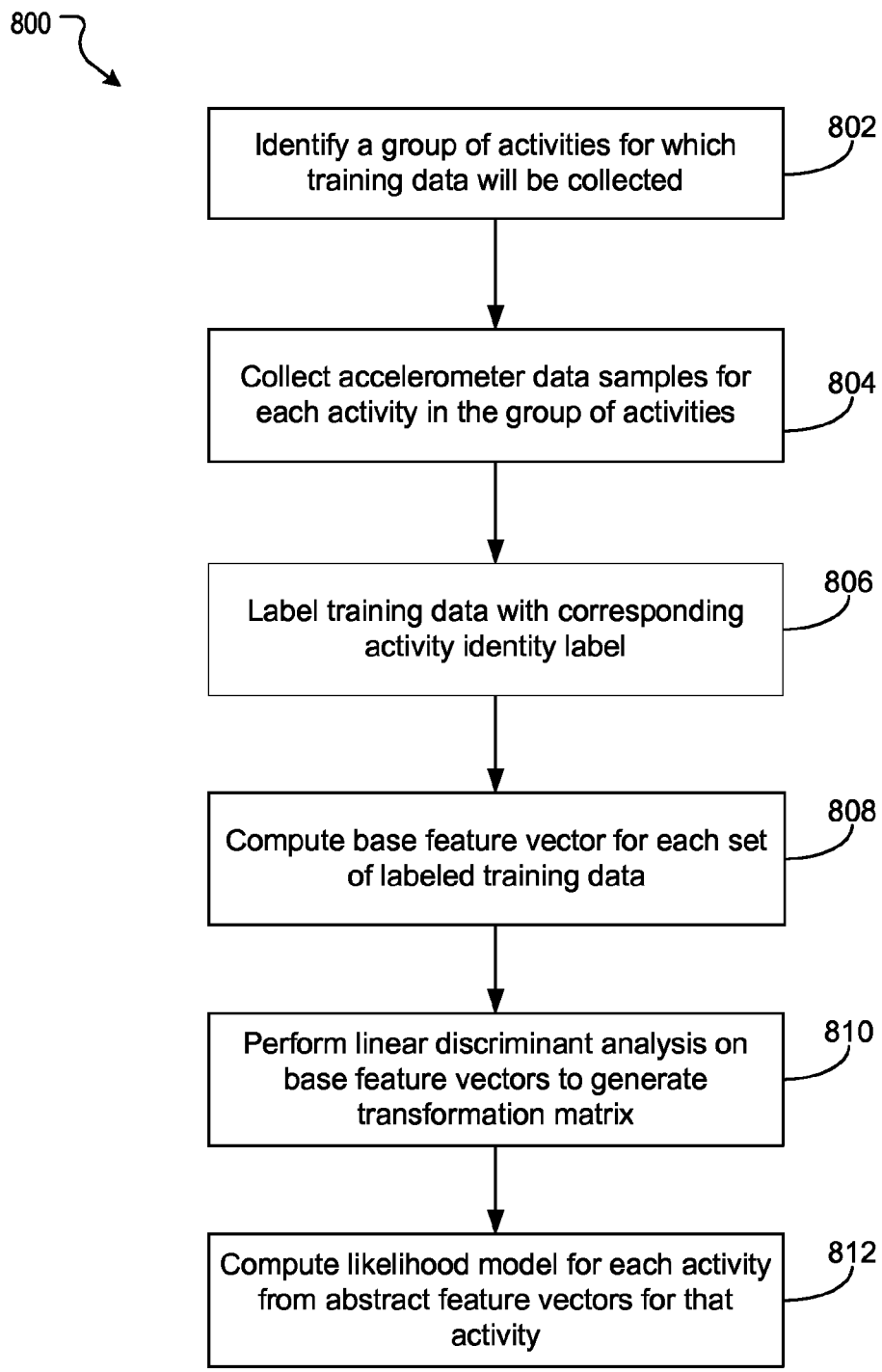
FIG. 8 is a flow diagram of an example process for computing abstract features and likelihood models used to determine a presumed activity.

FIG. 8 is a flowchart of an example process 800 for collecting and analyzing training data to obtain abstract features and a likelihood model for determining a presumed activity based on motion states of a mobile device. During a training phase, a group of activities for which training data will be collected is identified at 802. Accelerometer data samples are collected for each activity in the group of activities at 804. The collected accelerometer data samples, or training data, are labeled with a corresponding activity identity label at 806. For example, in the training phase, the activity for which training data is collected is already known, so training data collected for a particular activity can be automatically labeled with the identity label for that particular activity. For each set of labeled training data (a labeled collection of windows of accelerometer samples), a base feature vector is computed at 808. The result is N sets of base feature vectors, where N is the number of activities.

Linear discriminant analysis is performed on the base feature vectors in the N sets of base feature vectors to generate an LDA transformation matrix at 810. Application of the LDA transformation matrix on the N sets of M-dimensional base feature vectors transforms the base feature vectors into N sets of (N−1)-dimensional abstract feature vectors. The resulting abstract feature vectors are such that, the vectors within each set (i.e., those computed from windows of accelerometer data for the same activity) are close together, while the vectors belonging to differing activities are far apart. In other words, linear discriminant analysis determines the optimal linear combination of the base feature dimensions to result in N−1 linearly independent dimensions, such that, features derived from training data from the same activity, when transformed into the abstract feature vectors with N−1 dimensions, clump together, and features derived from training data from different activities, when transformed, are far apart. After the transformation matrix is generated and abstract features are obtained, a likelihood model is computed for each activity from abstract feature vectors for that activity at 812.

Figure 9:
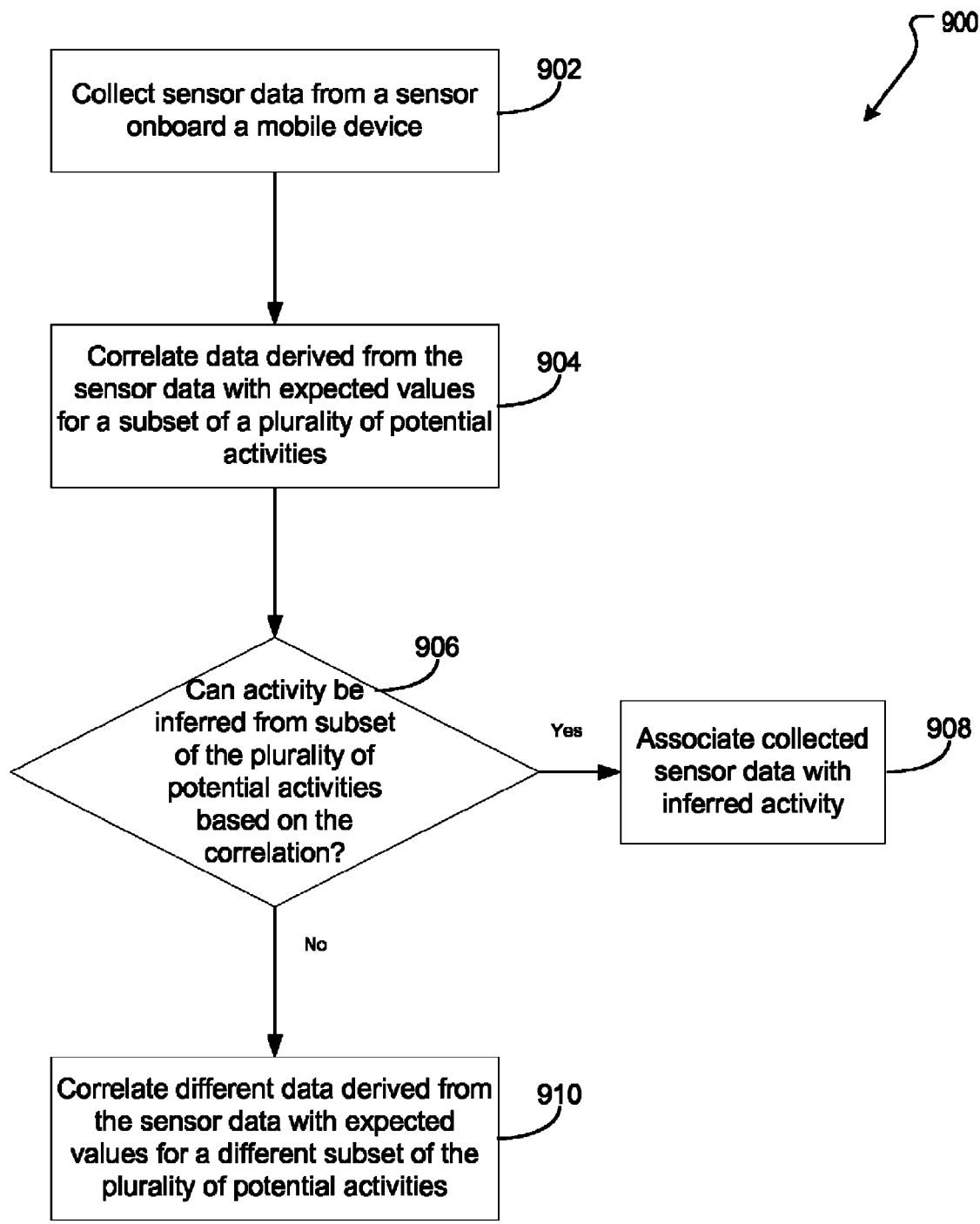
FIG. 9 is a flowchart of an example process for determining an inferred activity based on correlating derived data with expected values for activities in different tiers.

FIG. 9 is a flowchart of an example process 900 for determining an inferred (i.e., presumed) activity based on correlating derived data with expected values for activities in different tiers. Sensor data is collected from a sensor onboard a mobile device at 902. Data derived from the sensor data is correlated with expected values for a subset of a plurality of potential activities at 904. A determination is made as to whether a particular activity can be inferred from the subset of the plurality of potential activities based on the correlation at 906. If an activity can be inferred from the subset of potential activities, the collected sensor data is associated with the inferred activity at 908. If an activity cannot be inferred from the subset of potential activities, different data derived from the sensor data can be correlated with expected values for a different subset of the plurality of potential activities at 910. Accordingly, the process 900 may continue in iterations if additional subsets of potential activities are available for evaluation or until a particular activity can be inferred from a particular subset of potential activities.

Using a tiered approach to determining an inferred activity, the complexity of the analysis for distinguishing among different activities can be reduced by selecting data that is more suitable for distinguishing particular activities and comparing collected data (or derived values of collected data) with the selected data for those particular activities. The tiers may alternatively, or in addition, be based on how easily activities in a particular subset are distinguished. The example process 900 can be performed using software executed on a mobile device that is adapted to infer activities in multiple tiers or multiple iterations.

Exemplary Device Architecture

Figure 10:
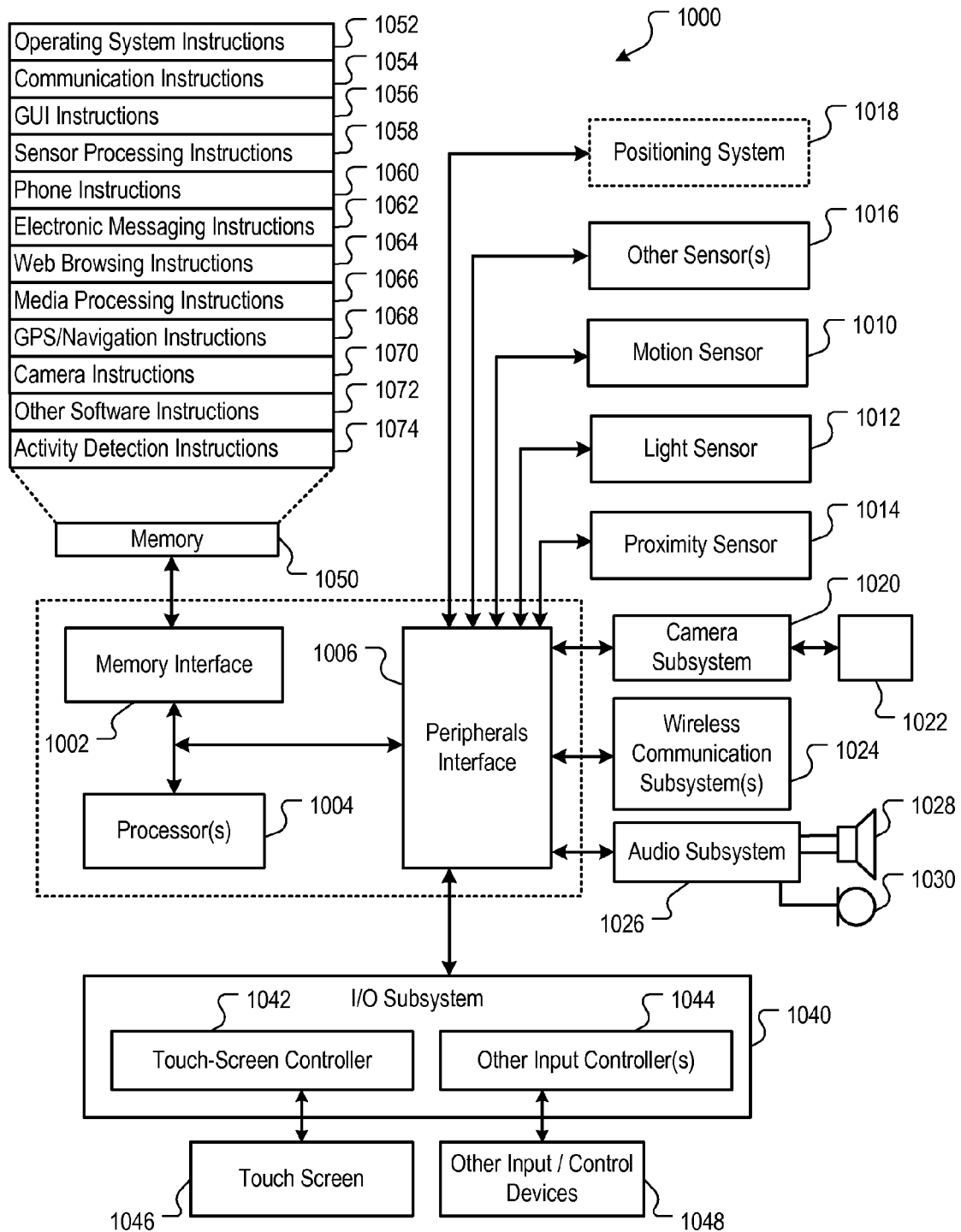
FIG. 10 is a block diagram of exemplary hardware architecture for implementing the processes described in reference to FIGS. 1-9.

FIG. 10 is a block diagram 1000 of an example implementation of the mobile device 100 of FIG. 1. The mobile device 100 can include a memory interface 1002 one or more data processors, image processors and/or central processing units 1004, and a peripherals interface 1006. The memory interface 1002, the one or more processors 1004 and/or the peripherals interface 1006 can be separate components or can be integrated in one or more integrated circuits. The various components in the mobile device 100 can be coupled by one or more communication buses or signal lines.

Sensors, devices and subsystems can be coupled to the peripherals interface 1006 to facilitate multiple functionalities. For example, a motion sensor 1010, a light sensor 1012, and a proximity sensor 1014 can be coupled to the peripherals interface 1006 to facilitate the orientation, lighting and proximity functions described with respect to FIG. 1. Other sensors 1016 can also be connected to the peripherals interface 1006, such as a GPS receiver, a temperature sensor, a biometric sensor, or other sensing device, to facilitate related functionalities.

A camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which the mobile device 100 is intended to operate. For example, a mobile device 100 may include communication subsystems 1024 designed to operate over a GSM network, a GPRS network, an EDGE network, a 3G or 4G network, a Wi-Fi or WiMax network, and a Bluetooth™ network. In particular, the wireless communication subsystems 1024 may include hosting protocols such that the device 100 may be configured as a base station for other wireless devices.

An audio subsystem 1026 can be coupled to a speaker 1028 and a microphone 1030 to facilitate voice-enabled functions, such as voice recognition, voice replication, digital recording, and telephony functions.

The I/O subsystem 1040 can include a touch screen controller 1042 and/or other input controller(s) 1044. The touch-screen controller 1042 can be coupled to a touch screen 1046. The touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 1046.

The other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of the speaker 1028 and/or the microphone 1030.

In one implementation, a' pressing of the button for a first duration may disengage a lock of the touch screen 1046; and a pressing of the button for a second duration that is longer than the first duration may turn power to the mobile device 100 on or off. The user may be able to customize a functionality of one or more of the buttons. The touch screen 1046 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 1002 can be coupled to memory 1050. The memory 1050 can include high-speed random access memory and/or non-volatile memory, such as one or more magnetic disk storage devices, one or more optical storage devices, and/or flash memory (e.g., NAND, NOR). The memory 1050 can store an operating system 1052, such as Darwin, RTXC, LINUX, UNIX, OS X, WINDOWS, or an embedded operating system such as VxWorks. The operating system 1052 may include instructions for handling basic system services and for performing hardware dependent tasks. In some implementations, the operating system 1052 handles timekeeping tasks, including maintaining the date and time (e.g., a clock) on the mobile device 100. In some implementations, the operating system 1052 can be a kernel (e.g., UNIX kernel).

The memory, 1050 may also store communication instructions 1054 to facilitate communicating with one or more additional devices, one or more computers and/or one or more servers. The memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; other software instructions 1072 to facilitate other related processes and functions; and/or activity detection instructions 1074 to facilitate determination of presumed activities based on detected motion.

The memory 1050 can also store data, including but not limited to documents, images, video files, audio files, and other data.

In some implementations, the mobile device 100 includes a positioning system 1018. In various implementations, the positioning system 1018 can be provided by a separate device coupled to the mobile device 100, or can be provided internal to the mobile device. In some implementations, the positioning system 1018 can employ positioning technology including a GPS, a cellular grid, URIs or any other technology for determining the geographic location of a device. In some implementations, the positioning system 1018 can employ a service provided by a positioning service such as, for example, SkyHook Wireless of Boston, Mass., or Rosum Corporation of Mountain View, Calif. In other implementations, the positioning system 1018 can be provided by an accelerometer and a compass using dead reckoning techniques. In such implementations, the user can occasionally reset the positioning system by marking the mobile device's presence at a known location (e.g., a landmark or intersection). In still other implementations, the user can enter a set of position coordinates (e.g., latitude, longitude) for the mobile device. For example, the position coordinates can be typed into the phone (e.g., using a virtual keyboard) or selected by touching a point on a map. Position coordinates can also be acquired from another device (e.g., a car navigation system) by syncing or linking with the other device. In other implementations, the positioning system 1018 can be provided by using wireless signal strength and one or more locations of known wireless signal sources to provide the current location. Wireless signal sources can include access points and/or cellular towers. Other techniques to determine a current location of the mobile device 100 can be used and other configurations of the positioning system 1018 are possible.

Each of the above identified instructions and applications can correspond to a set of instructions for performing one or more functions described above. These instructions need not be implemented as separate software programs, procedures or modules. The memory 1050 can include additional instructions or fewer instructions. Furthermore, various functions of the mobile device 100 may be implemented in hardware and/or in software, including in one or more signal processing and/or application specific integrated circuits.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a mobile device, the method comprising:
   receiving a plurality of sensor values detected by one or more sensors onboard the mobile device over a period of time;
   calculating, by one or more processors of the mobile device, a plurality of derived values from the plurality of sensor values represented in a base feature vector;
   generating one or more abstract values by selectively combining the derived values, the one or more abstract values usable to discriminate between a plurality of possible activities, the plurality of possible activities being grouped into at least two tiers including a first tier and a second tier that is lower than the first tier; and
   identifying, by the one or more processors, a presumed activity from the possible activities based on a level of similarity between the one or more abstract values and expected values of each of the plurality of possible activities that correspond to the one or more abstract values, wherein identifying the presumed activity comprises:
      determining whether the presumed activity belongs to the first tier by applying a first linear discriminant analysis transformation matrix to the base feature vector; and
      determining whether the presumed activity belongs to the second tier by applying a second linear discriminant analysis transformation matrix to the base feature vector, the second linear discriminant analysis transformation matrix being different from the first linear discriminant analysis transformation matrix.

2. The method of claim 1, wherein the derived values are selectively combined by determining at least one linear combination of the derived values to generate the one or more abstract values based on results of a linear discriminant analysis.

3. The method of claim 2, wherein the linear discriminant analysis is performed on derived values associated with sensor data samples collected during a training phase prior to receiving the plurality of sensor values.

4. The method of claim 3, wherein the linear discriminant analysis identifies particular derived features relevant to distinguishing different activities based on a degree to which values of derived features for one activity differ from values of derived features for other activities.

5. The method of claim 1, wherein identifying a presumed activity further includes computing, for each of the plurality of possible activities, a Gaussian likelihood model representing a probability that, given a particular activity, a specific set of abstract values is observed.

6. The method of claim 5, wherein identifying a presumed activity further includes determining, for each of the plurality of possible activities, a posterior probability that a particular activity is occurring given the one or more abstract values.

7. The method of claim 6, wherein the posterior probability is based at least in part on at least one of a frequency that the particular activity occurs during normal use of the mobile device based on empirical data of prior occurrences of the particular activity, a presence of an external power source connected to the mobile device, a current speed of movement of the mobile device based on global positioning system data, or a presence of at least one vehicular peripheral device connected to the mobile device.

8. The method of claim 6, wherein the posterior probability for a particular activity is determined by including the Gaussian likelihood model and a prior probability density for the particular activity as inputs into a Bayesian filter, the prior probability density representing a probability that the particular activity is occurring at a given time based on prior contextual data.

9. The method of claim 8, wherein the prior contextual data includes at least one of a prior presumed activity determined for sensor values received during a previous period of time.

10. The method of claim 8, wherein the presumed activity is identified by selecting a particular activity associated with a highest posterior probability compared to each activity for which a posterior probability is determined.

11. The method of claim 1, wherein the abstract values are represented in a transformed feature vector, wherein the transformed feature vector is obtained after applying a linear discriminant analysis transformation matrix to the base feature vector.

12. The method of claim 1, wherein identifying a presumed activity further includes:
  determining a level of similarity between the one or more abstract values and expected values of each activity in the first tier that correspond to the one or more abstract values; and
  if the level of similarity associated with each activity in the first tier fails to exceed a predefined minimum level of similarity, determining a level of similarity between one or more different abstract values and expected values of each activity in the second tier that correspond to the one or more different abstract values.

13. The method of claim 1, wherein the plurality of derived values correspond to derived features representing different characteristics of detected motion associated with the mobile device, the derived features including at least one of a mean magnitude, a variance of magnitude, a number of zero crossings, a mean tilt angle, a variance of tilt angle, energy associated with a magnitude frequency band, or energy associated with a tilt angle frequency band.

14. A non-transitory computer-readable storage medium storing a computer program product, the computer program product including instructions that, when executed, cause one or more processors to perform operations comprising:
  receiving a plurality of sensor values detected by one or more sensors onboard a mobile device over a period of time;
  calculating a base feature vector including a plurality of derived values determined from the plurality of sensor values;
  transforming the base feature vector into an abstract feature vector, the abstract feature vector including one or more abstract values determined based on combining derived values in the base feature vector, the one or more abstract values usable to discriminate between a plurality of possible activities, the plurality of possible activities being grouped into at least two tiers including a first tier and a second tier that is lower than the first tier; and
  identifying a presumed activity corresponding to the plurality of sensor values detected over the period of time, the presumed activity identified from a plurality of possible activities based on a level of similarity between the one or more abstract values and expected values of each of the plurality of possible activities that correspond to the one or more abstract values, wherein identifying the presumed activity comprises:
    determining whether the presumed activity belongs to the first tier by applying a first linear discriminant analysis transformation matrix to the base feature vector; and
    determining whether the presumed activity belongs to the second tier by applying a second linear discriminant analysis transformation matrix to the base feature vector, the second linear discriminant analysis transformation matrix being different from the first linear discriminant analysis transformation matrix.

15. The non-transitory computer-readable storage medium of claim 14 wherein the base feature vector is transformed into an abstract feature vector by applying a linear discriminant analysis transformation vector to the base feature vector, the linear discriminant analysis transformation vector configured to transform derived values into abstract values associated with abstract features.

16. The non-transitory computer-readable storage medium of claim 15, wherein the abstract features are identified based on a degree to which values of the abstract features for one activity differ from values of the abstract features for other activities.

17. A mobile device comprising:
  a sensor operable to receive a plurality of sensor values over a period of time;
  a transformation module operable to calculate a plurality of derived values from the plurality of sensor values and to generate one or more abstract values by selectively combining the derived values, the one or more abstract values usable to discriminate between a plurality of possible activities, the plurality of possible activities being grouped into at least two tiers including a first tier and a second tier that is lower than the first tier; and
  a classifier module operable to identify a presumed activity corresponding to the plurality of sensor values detected over the period of time, the presumed activity identified from a plurality of possible activities based on a level of similarity between the one or more abstract values and expected values of each of the plurality of possible activities that correspond to the one or more abstract values, wherein identifying the presumed activity comprises:
    determining whether the presumed activity belongs to the first tier by applying a first linear discriminant analysis transformation matrix to a base feature vector that represents the derived values; and
    determining whether the presumed activity belongs to the second tier by applying a second linear discriminant analysis transformation matrix to the base feature vector, the second linear discriminant analysis transformation matrix being different from the first linear discriminant analysis transformation matrix.

18. The mobile device of claim 17, wherein the sensor is an accelerometer.

19. The mobile device of claim 17, wherein identifying a presumed activity further includes computing, for each of the plurality of possible activities, a Gaussian likelihood model representing a probability that, given a particular activity, a specific set of abstract values is observed.

* * * * *